(12) United States Patent
Kim et al.

(10) Patent No.: US 11,681,899 B2
(45) Date of Patent: Jun. 20, 2023

(54) DIVIDING NEURAL NETWORKS

(71) Applicants: Samsung Electronics Co., Ltd., Suwon-si (KR); POSTECH ACADEMY-INDUSTRY FOUNDATION, Gyeonsangbuk-Do (KR)

(72) Inventors: Sungho Kim, Yongin-si (KR); Yulhwa Kim, Daegu (KR); Hyungjun Kim, Pohang-si (KR); Jae-Joon Kim, Pohang-si (KR); Jinseok Kim, Incheon (KR)

(73) Assignees: Samsong Electronics Co., Ltd., Gyeonggi-do (KR); POSTECH ACADEMY-INDUSTRY FOUNDATION, Gyeonsangbuk-Do (KR)

(*) Notice: Subject to any disclaimer, the term of this patent is extended or adjusted under 35 U.S.C. 154(b) by 939 days.

(21) Appl. No.: 16/561,378

(22) Filed: Sep. 5, 2019

(65) Prior Publication Data
US 2020/0184315 A1 Jun. 11, 2020

(30) Foreign Application Priority Data
Dec. 7, 2018 (KR) .................. 10-2018-0157471

(51) Int. Cl.
*G06N 20/00* (2019.01)
*G06N 3/02* (2006.01)
(Continued)

(52) U.S. Cl.
CPC ............... *G06N 3/045* (2023.01); *G06N 3/02* (2013.01); *G06N 3/063* (2013.01); *G06N 3/08* (2013.01); *G06N 20/00* (2019.01)

(58) Field of Classification Search
CPC ........ G06N 3/0454; G06N 20/00; G06N 3/02; G06N 3/063; G06N 3/08; G06N 3/045
(Continued)

(56) References Cited

U.S. PATENT DOCUMENTS 10,360,971 B1 * 7/2019 Hokenmaier .......... G06N 3/063
10,387,770 B2 8/2019 Brothers et al.
(Continued)

FOREIGN PATENT DOCUMENTS

CN 107103113 A 8/2017
JP 6287999 B2 3/2018
(Continued)

OTHER PUBLICATIONS

O. Ozdamar; I. Yaylali; P. Jayaker; C.N. Lopez., "Multilevel neural network system for EEG spike detection," Computer-Based Medical Systems, 1991, pp. 272-279.
(Continued)

*Primary Examiner* — Manglesh M Patel
(74) *Attorney, Agent, or Firm* — Harness, Dickey & Pierce, P.L.C.

(57) ABSTRACT

A method of implementing a neural network in a neuromorphic apparatus having a memory and processing circuitry, where the method includes dividing, by the processing circuitry, the neural network into a plurality of sub-networks based on a size of a core of the memory to implement the neural network, initializing, by the processing circuitry, a hyper-parameter used in the sub-networks, and training, by the processing circuitry, the sub-networks by using the hyper-parameter.

18 Claims, 11 Drawing Sheets

<BIOLOGICAL NEURON>

<MATHEMATICAL MODEL OF BIOLOGICAL NEURON>

(51) Int. Cl.
*G06N 3/045* (2023.01)
*G06N 3/08* (2023.01)
*G06N 3/063* (2023.01)

(58) Field of Classification Search
USPC .......................................................... 706/25
See application file for complete search history.

(56) References Cited

U.S. PATENT DOCUMENTS

| | | | |
|---|---|---|---|
| 2016/0358068 A1 | 12/2016 | Brothers et al. | |
| 2016/0379137 A1 | 12/2016 | Burger et al. | |
| 2017/0039471 A1 | 2/2017 | Ogawa | |
| 2017/0169326 A1 | 6/2017 | Diamos et al. | |
| 2018/0046904 A1* | 2/2018 | Andreopoulos | G06N 3/063 |
| 2018/0107918 A1* | 4/2018 | Amir | G06N 3/063 |
| 2020/0074284 A1* | 3/2020 | Kim | G06N 3/063 |
| 2021/0182684 A1* | 6/2021 | Zappi | G06N 3/0454 |
| 2021/0319293 A1* | 10/2021 | Lee | G06N 3/065 |
| 2021/0406694 A1* | 12/2021 | Kim | G06N 3/084 |
| 2022/0012564 A1* | 1/2022 | Zjajo | G06N 3/0454 |
| 2022/0138532 A1* | 5/2022 | Dalli | G06N 3/0427 |
| | | | 706/27 |

FOREIGN PATENT DOCUMENTS

| | | |
|---|---|---|
| KR | 1020160143548 A | 12/2016 |
| KR | 1020160145482 A | 12/2016 |

OTHER PUBLICATIONS

Ping Chi et al., "PRIME: a novel processing-in-memory architecture for neural network computation in ReRAM-based main memory," ISCA '16, pp. 27-39.

Esser, Steven K., et al. "Convolutional networks for fast, energy-efficient neuromorphic computing," Proceedings of the National Academy of Sciences (2016): 201604850.

Tang, Tianqi, et al. "Binary convolutional neural network on RRAM." Design Automation Conference (ASP-DAC), 2017 22nd Asia and South Pacific. IEEE, 2017.

Shafiee, Ali, et al. "ISAAC: A convolutional neural network accelerator with in-situ analog arithmetic in crossbars." Proceedings of the 43rd International Symposium on Computer Architecture. IEEE Press, 2016.

Xia, Lixue, et al. "Switched by input: Power efficient structure for RRAM-based convolutional neural network." Proceedings of the 53rd Annual Design Automation Conference. ACM, 2016.

Tensorflow Alphabet Inc. 2017. Deep MNIST for Experts. (Feb. 2017). Retrieved Nov. 20, 2017 from https://www.tensorflow.org/get_started/mnist/pros.

Sergey Zagoruyko. 2015. 92.45% on CIFAR-10 in Torch. (Jul. 2015). Retrieved Nov. 20, 2017 from http://torch.ch/blog/2015/07/30/cifar.html.

Alex Krizhevsky, Ilya Sutskever, and Geoffrey E Hinton. 2012. "Imagenet classification with deep convolutional neural networks," In Advances in neural information processing systems. 1097-1105.

\* cited by examiner

DIVIDING NEURAL NETWORKS

CROSS-REFERENCE TO RELATED APPLICATION

This application claims the benefit of Korean Patent Application No. 10-2018-0157471, filed on Dec. 7, 2018, in the Korean Intellectual Property Office, the disclosure of which is incorporated herein in its entirety by reference.

BACKGROUND

1. Field

The present disclosure relates to the processing of neural networks.

2. Description of the Related Art

A neural network apparatus (e.g., a neuromorphic apparatus) oriented on a memory refers to a computational scientific architecture that models a biological brain. Along with memory-oriented neural network technology, research has been actively carried out to analyze input data and extract effective information by using a memory-oriented neural network in various types of electronic systems.

Thus, to extract desired information by analyzing a large amount of input data in real time using a memory-oriented neural network, it may be advantageous to process computations in a more efficient manner.

SUMMARY

Some example embodiments may include a method of dividing a neural network and/or neuromorphic apparatuses configured to divide neural networks. Some example embodiments may include a computer-readable recording medium having recorded thereon a program for executing a method on a computer or a device such as a neuromorphic apparatus. Additional aspects will be set forth in part in the description which follows and, in part, will be apparent from the description, or may be learned by practice of some example embodiments.

According to some example embodiments, a method of implementing a neural network in a neuromorphic apparatus having a memory and processing circuitry, wherein the method includes dividing, by the processing circuitry, the neural network into a plurality of sub-networks based on a size of a core of the memory to implement the neural network, initializing, by the processing circuitry, a hyper-parameter used in the sub-networks, and training, by the processing circuitry, the sub-networks by using the hyper-parameter.

According to some example embodiments, a non-transitory computer-readable recording medium has recorded thereon a program for executing the method on a computer or a device such as a neuromorphic apparatus.

According to some example embodiments, an apparatus for implementing a neural network includes a memory including a core and processing circuitry configured to drive the neural network, in which the processing circuitry is configured to divide the neural network into a plurality of sub-networks based on a size of a core of the memory, to initialize a hyper-parameter used in the sub-networks, and to train the sub-networks by using the hyper-parameter.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Figure 1:
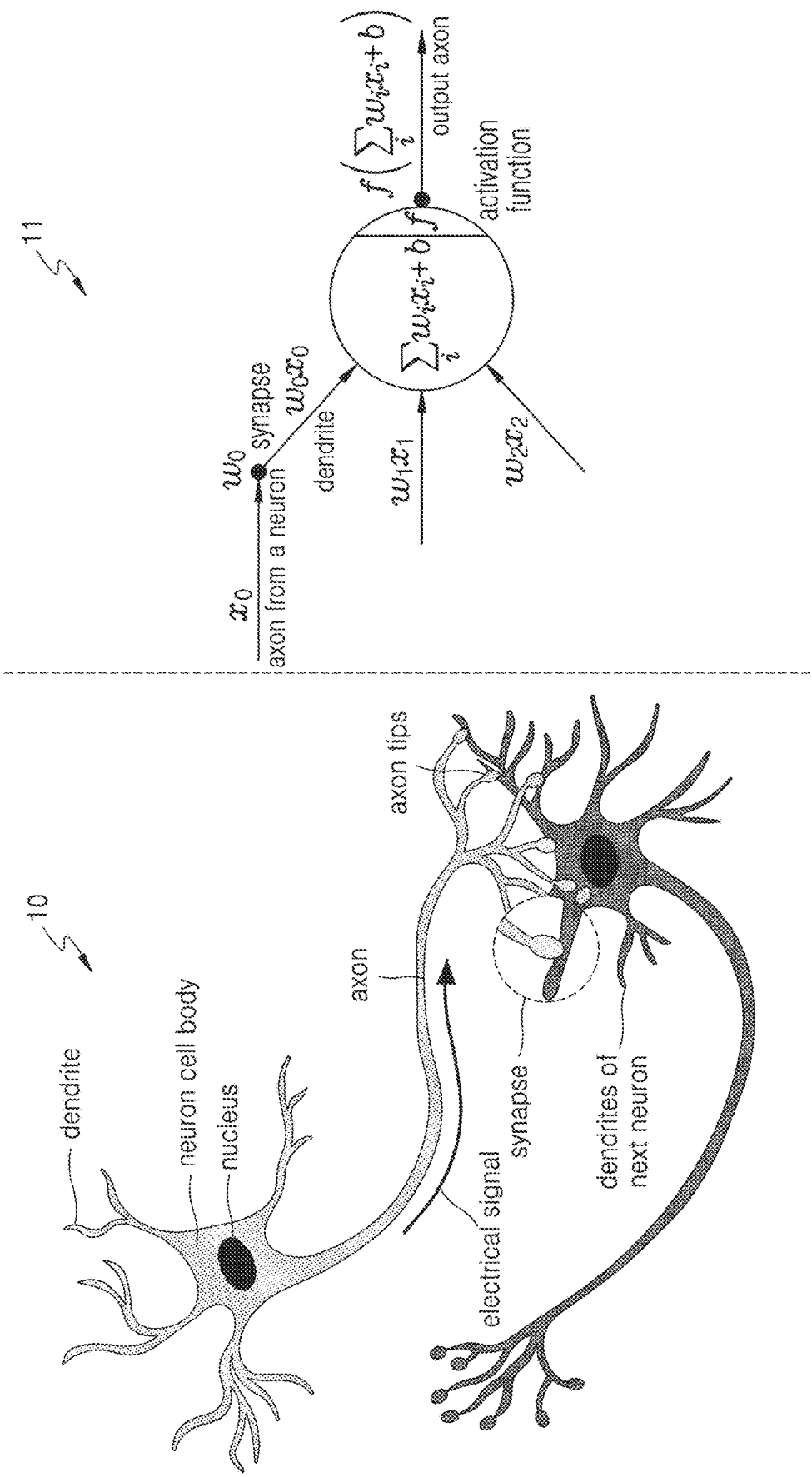
FIG. 1 is a view for describing a mathematical model that simulates a biological neuron and an operation thereof.

Reference will now be made in detail to some example embodiments, some of which are illustrated in the accompanying drawings, wherein like reference numerals refer to like elements throughout. In this regard, some example embodiments may have different forms than other example embodiments, and a description of some example embodiments should not be construed as being limited to the descriptions set forth herein. Accordingly, some example embodiments are described below, by referring to the figures, to explain some aspects. As used herein, the term "and/or" includes any and all combinations of one or more of the associated listed items. Expressions such as "at least one of," when preceding a list of elements, modify the entire list of elements and do not modify the individual elements of the list.

Although some terms used in some example embodiments may also be general terms popularly used at present, such terms may vary according to the intention of those of ordinary skill in the art, judicial precedents, or introduction of new technology. In addition, in a specific case, the applicant voluntarily may select terms, and in this case, the meaning of the terms is disclosed in a corresponding description part. Thus, terms used in the specification should be defined not by the simple names of such terms but by the meaning of such terms and the contents throughout the specification.

Throughout the entirety of the specification of the present disclosure, if it is assumed that a certain part includes a certain component, the term "including" means that a corresponding component may further include other components unless a specific meaning opposed to the corresponding component is written. The term used in the embodiments such as "unit" or "module" indicates a unit for processing at least one function or operation, and may be implemented in hardware, software, or in a combination of hardware and software.

Although the terms including ordinal numbers such as "first" and "second" used herein may be used to describe various elements, these terms do not limit the corresponding elements. These terms may be used for the purpose of distinguishing one element from another element.

Some example embodiments may be described in detail with reference to the attached drawings. However, the following description of some example embodiments should not be construed as limiting the scope of example embodiments, and what may be easily deduced by those of ordinary skill in the art should be construed as falling within the scope of example embodiments. Hereinafter, some example embodiments will be described in detail with reference to the accompanying drawings.

FIG. 1 is a view for describing a mathematical model that simulates a biological neuron and an operation thereof.

A biological neuron means a cell in a human neural system. The biological neuron is one of the basic biological computational entities. A human brain may include about 100 trillion interconnects between about 100 billion biological neurons.

Referring to FIG. 1, a biological neuron 10 is a single cell. The biological neuron 10 may include a neuron cell body including a nucleus and various organelles. The various organelles may include mitochondria, a plurality of dendrites radiated from the neuron cell body, and an axon that ends in many branch extensions.

Generally, the axon transmits signals from a neuron to another neuron, and the dendrite receives a signal from another neuron. For example, when different neurons are connected to each other, a signal delivered through the axon of the neuron may be received by the dendrite of the other neuron. A signal may be delivered through specialized connection called a synapse between neurons that form a neural network by being connected to one another. A neuron that secretes a neurotransmitter based on a synapse may be referred to as a presynaptic neuron, and the neuron receiving information delivered through the neurotransmitter may be referred to as a postsynaptic neuron.

The human brain may train and memorize a large amount of information by delivering and processing various signals through a neural network formed by interconnection between numerous neurons. Numerous interconnects between neurons in the human brain are directly related to a massively parallel nature of biological computing, such that various attempts have been made to efficiently process a large amount of information by simulating an artificial neural network. For example, a neuromorphic apparatus has been studied as a computing system designed to implement the artificial neural network in a neural level.

An operation of the biological neuron 10 may be simulated as a mathematical model 11. The mathematical model 11 corresponding to the biological neuron 10 may include a multiplication operation that multiplies information from multiple neurons by a synaptic weight, an addition operation ($\Sigma$) that adds values multiplied by the synaptic weight ($\omega_0 x0$, $\omega_1 x1$, and $\omega_2 x2$), and an operation that applies a characteristic function (b) and an activation function (f) to an addition result. A neuromorphic operation result may be provided by a neuromorphic operation. Herein, the values $x_0$, $x_1$, $x_2$, etc. correspond to axon values, and the values $\omega_0$, $\omega_1$, $\omega_2$, etc. correspond to synaptic weights.

Figure 2:
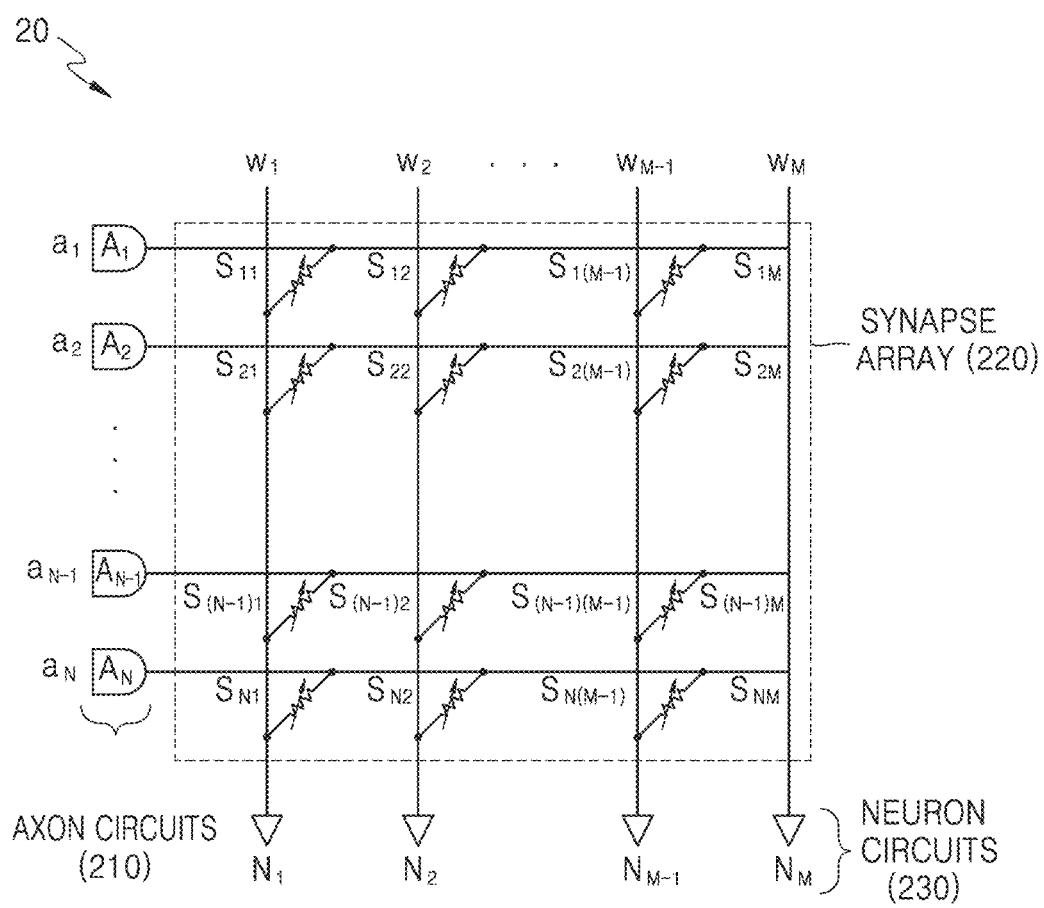
FIG. 2 is a view for describing an example of a core of a memory included in a neuromorphic apparatus in accordance with some example embodiments.

FIG. 2 is a view for describing an example of a core of a memory included in a neuromorphic apparatus in accordance with some example embodiments.

Referring to FIG. 2, a core 20 may include a two-dimensional (2D) array circuit. For example, a core may include N (N is an arbitrary natural number) axon circuits $A_1$ through $A_N$ 210, M (M is an arbitrary natural number) neural circuits $N_1$ through $N_M$ 230, and a synapse array 220 including N×M synapses $S_{11}$ through $S_{NM}$.

In some example embodiments, each synapse of a synapse array 220 may be arranged at each of intersections between first-direction lines extending from the axon circuits 210 in a first direction and second-direction lines extending from the neuron circuits 230 in a second direction. In FIG. 2, for convenience of a description, the first direction is illustrated as a row direction and the second direction is illustrated as a column direction, but the first direction may be a column direction and the second direction may be a row direction.

In some example embodiments, each of the axon circuits 210 may be or may have been designed, formed, and/or utilized to simulate an axon of a biological neuron (10 of FIG. 1). For example, the axon of the neuron transmits signals from the neuron to another neuron, such that each of the axon circuits 210 simulating the axon of the neuron may deliver an input activation (e.g., axons $a_1$, $a_2$, . . . , $a_N$) to first-direction lines. The input activation may correspond to a neurotransmitter delivered through a neuron, for example, by transmitting an electrical signal input to each of the axon circuits 210. In some example embodiments, each of the axon circuits 210 may include a memory, a register, or a buffer that stores input information. In some example embodiments, an input activation may be a binary activation having a binary value. For example, the binary activation may include 1-bit information corresponding to a logic value 0 or 1. However, in other example embodiments, an input activation may have other values, such as a ternary value or a multi-bit value.

In some example embodiments, each of the synapses $S_{11}$ through $S_{NM}$ of the synapse array 220 may be or may have been designed, formed, and/or utilized to simulate a synapse between neurons. For example, the synapse array 220 may store synaptic weights corresponding to a connection strength between neurons. Although $w_1$, $w_2$, . . . , $w_M$ are illustrated in FIG. 2 as synaptic weights to be stored in the synapses $S_{11}$ through $S_{NM}$ for convenience, other synaptic weights may also be stored in the synapses $S_{11}$ through $S_{NM}$. In some example embodiments, each of the synapses $S_{11}$ through $S_{NM}$ of the synapse array 220 may include a memory element configured to store a synaptic weight and/or may be connected to another memory configured to stores a synaptic weight.

In some example embodiments, a synapse array 220 may be configured to receive an input activation delivered from each of the axon circuits 210 through a corresponding first-direction line and/or to output a result of a neuromorphic operation between a stored synaptic weight and the input activation. For example, in some example embodiments, a neuromorphic operation between the synaptic weight and the input activation may be a multiplication operation, while in other example embodiments, the neuromorphic operation may not include multiplication. In some example embodiments, a result of the neuromorphic operation between the synaptic weight and the input activation may be a value obtained by another arbitrary proper operation in a context of simulating a strength or magnitude of the input activation adjusted based on a connection strength between neurons.

In some example embodiments, a magnitude and/or strength of a signal delivered from an axon circuits 210 to a neuron circuits 230 may be adjusted based on a neuromorphic operation between a synaptic weight and an input activation. For example, an operation of adjusting a magnitude or strength of a signal delivered to a next neuron may be based on a connection strength between neurons may be simulated using the synapse array 220.

In some example embodiments, each of the neuron circuits 230 may be designed, formed, and/or utilized to simulate a neuron including a dendrite. For example, a dendrite of a neuron may be configured to receives a signal from another neuron, and/or each of the neuron circuits 230 may be configured to receive a result of the neuromorphic operation between the synaptic weight and the input activation, for example, through a corresponding second-direction line. In some example embodiments, each of the neuron circuits 230 may be configured to determine whether to output a spike based on the result of the neuromorphic operation. For example, each of the neuron circuits 230 may be configured to output a spike based on cumulative value of results of the neuromorphic operation being greater than or equal to a preset threshold value. For example, output from a neuron circuit 230 may correspond to input activations to one or more axon circuits in a next stage. As another example, output from one or more axon circuits in a stage may correspond to input activations to an axon circuit in a next stage.

As used herein, neuron circuits 230 that are located in the rear stage with respect to the synapse array 220 may be referred to as postsynaptic neuron circuits. Similarly, as used herein, axon circuits 210 that are located in the front stage with respect to the synapse array 220 may be referred to as presynaptic neuron circuits.

In some example embodiments, each of the synapses $S_{11}$ through $S_{NM}$ may include, for example, variable resistor elements that is capable of switching between different resistance states depending on voltage or current applied to both ends, and may have a single-film structure or a multi-film structure including various substances having a plurality of resistance states, for example, a transition metal oxide, a metal oxide such as a Perovskite-based substance or the like, a phase change substance such as a chalcogenide-based substance or the like, a ferroelectric substance, a ferromagnetic substance, and so forth. As used herein, an operation in which a variable resistance element and/or synapse 30 changes from a high-resistance state to a low-resistance state may be referred to as a set operation. Similarly, as used herein, an operation in which a variable resistance element and/or synapse 30 changes from the low-resistance state to the high-resistance state may be referred to as a reset operation.

In some example embodiments, synapses $S_{11}$ through $S_{NM}$ may be implemented to have various characteristics that may be distinguished from a variable resistance element used in a memory such as resistive random-access memory (RRAM), programmable RAM (PRAM), ferroelectric RAM (FRAM), magnetic RAM (MRAM), or the like, such as a gradual resistance change between the set operation and the reset operation, an analog behavior in which a conductance gradually changes with the number of input electrical pulses, or the like. Such distinct characteristics may originate from a disparity between features of the variable resistance element in the memory and features of the synapse array 220 in the core 20 of the neuromorphic apparatus.

In some example embodiments, a number of axons connected to a single neuron of a neural network may amount to several thousands or several tens of thousands. Difficulties may arise in mapping the neural network to the core 20, for example, due to a physical size of the core 20, a neural network may be difficult to implement with a single core 20. For example, processing each of thousands or tens of thousands of neurons that are each represented in the core may involve storing intermediate results of some neurons in the memory, and later retrieving the intermediate results from the memory for inputting to other neurons. Such storing and retrieving may involve an expenditure of energy and/or latency in the propagative processing of the neural network, particularly in devices in which the intermediate results are stored by sampling resistive elements with a high-resolution analog-to-digital converter (ADC). By contrast, in some example embodiments, dividing the neural network into a set of sub-networks may limit the number of inputs to each resistive element, which may be sampled, for example, by a low-resolution ADC. Some example embodiments configured in this manner may utilize a comparatively simple configuration of components, which may promote the size, cost, power efficiency, and/or performance of the neural network and/or a neuromorphic apparatus or computer utilizing such a neural network.

Figure 11:
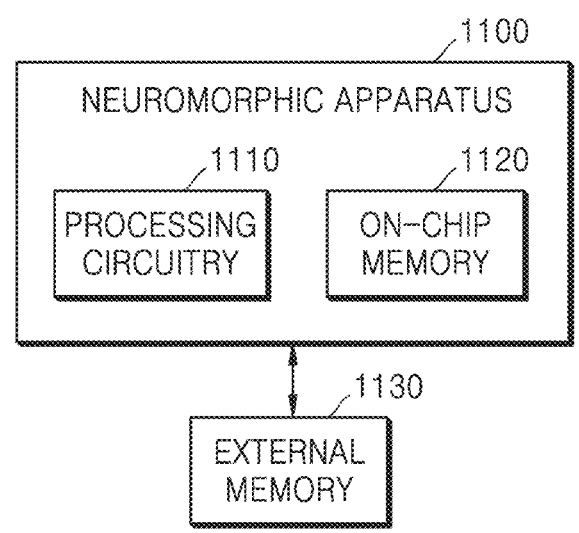
FIG. 11 is a structural diagram illustrating an example of a neuromorphic apparatus and a memory connected thereto in accordance with some example embodiments.

In FIG. 11, a neuromorphic apparatus 1100 according to some example embodiments may be configured to divide and/or slice the neural network into a plurality of sub-networks based on a size (e.g., the total number of axon circuits 210) of the at least one core 20 included in an on-chip memory 1120. The neuromorphic apparatus 1100 may be configured to train each of the sub-networks and/or to map the trained sub-networks to the on-chip memory 1120 to drive the neural network. An example neuromorphic apparatus 1100 may reduce consumption of power for an operation and/or may preserve an operation capability of the neural network.

Hereinbelow, some example embodiments including a neuromorphic apparatus 1100 are described with reference to FIGS. 3 through 10.

Figure 3:
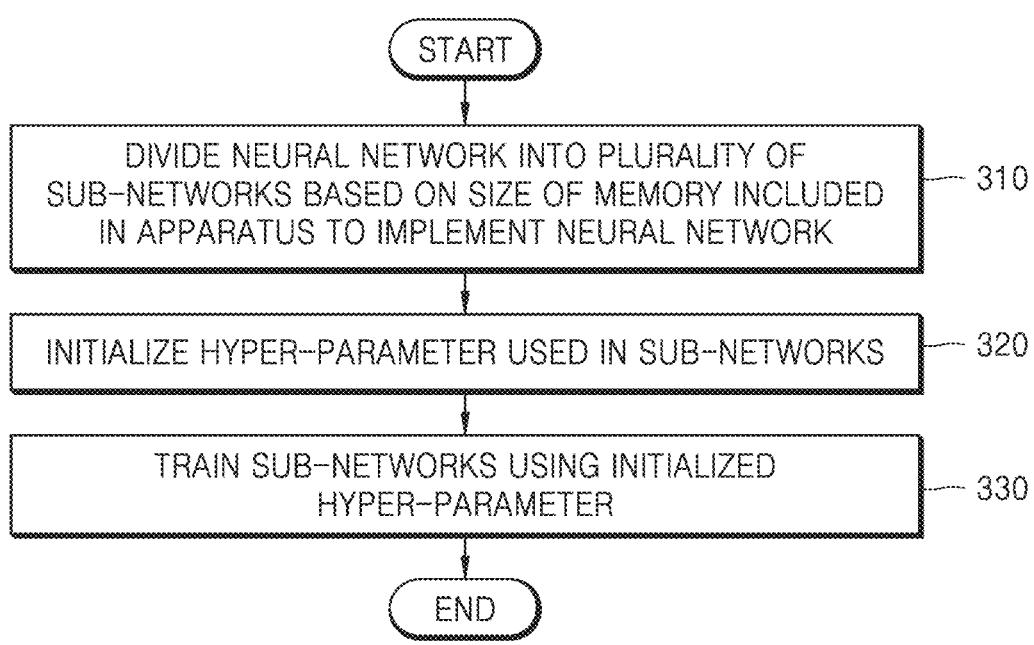
FIG. 3 is a flowchart illustrating an example in which a neuromorphic apparatus implements a neural network in accordance with some example embodiments.

FIG. 3 is a flowchart illustrating an example in which a neuromorphic apparatus is configured to implement a neural network in accordance with some example embodiments.

In operation 310 of FIG. 3, processing circuitry 1110 may divide a neural network into a plurality of sub-networks based on a size of the core 20 of the memory included in a neuromorphic apparatus 1100. For example, the processing circuitry 1110 may be configured to divide the neural network into the plurality of sub-networks based on the total number of axon circuits 210 included in the core 20 (i.e., the number of columns of the synapse array 220 included in the core 20). That is, the processing circuitry 1110 may be configured to divide the neural network such that the number of columns of the synapse array 220 included in the core 20 and the number of input activations of the sub-networks are equal to each other.

In operation 320 of FIG. 3, the processing circuitry 1110 may initialize a hyper-parameter used in the sub-network. As used herein, the term "hyper-parameter" may refer to one or more parameters that may affect an output value of the neural network 400. For example, referring to FIG. 6 discussed hereinbelow, the input activation that is transmitted to and received by the core 20, the kernel value stored in the core 20, and the like are examples of the parameter, and a threshold value, a slope, and the like, of the ReLU function applied by the activation function unit 540 are examples of the hyper-parameter. In some example embodiments, a parameter and/or a hyper-parameter may be set before training of a sub-network to be described with reference to operation 330 is performed. In some example embodiments, a parameter and/or a hyper-parameter may be derived (updated) through training of the sub-network.

In some example embodiments, processing circuitry 1110 may be configured to initialize the hyper-parameter with an initial value selected based on a size of the core 20. In other words, the processing circuitry 1110 may be configured to initialize the hyper-parameter with a value selected from among values indicating a standard deviation. Herein, the standard deviation may be calculated by merging the number of input activations of the sub-network with the size of the core.

In some example embodiments, processing circuitry 1110 may be configured to calculate a standard deviation a using Equation 1.

$$\sigma = \sqrt{\frac{2}{\text{Fan In}}} * \sqrt{\frac{1}{n}}, \quad (1)$$

wherein 'Fan In' indicates a number of input activations (i.e., axon circuits) of a sub-network and 'n' indicates a number into which the neural network is divided (i.e., the number of sub-networks).

In some example embodiments, the processing circuitry 1110 may be configured to calculate the standard deviation σ using Equation (1), and an increase in a dispersion of neuron values generated by division of the neural network may be prevented and/or attenuated. In some example embodiments in which a neural network is divided into sub-networks, a neuromorphic apparatus 1100 may be configured to reduce consumption of power for an operation and/or to preserve an operation capability of the neural network.

In operation 330 of FIG. 3, the processing circuitry 1110 may train the sub-networks by using the initialized hyper-parameter.

Hereinbelow, an example of a neural network will be described with reference to FIGS. 4 through 6.

Figure 4:
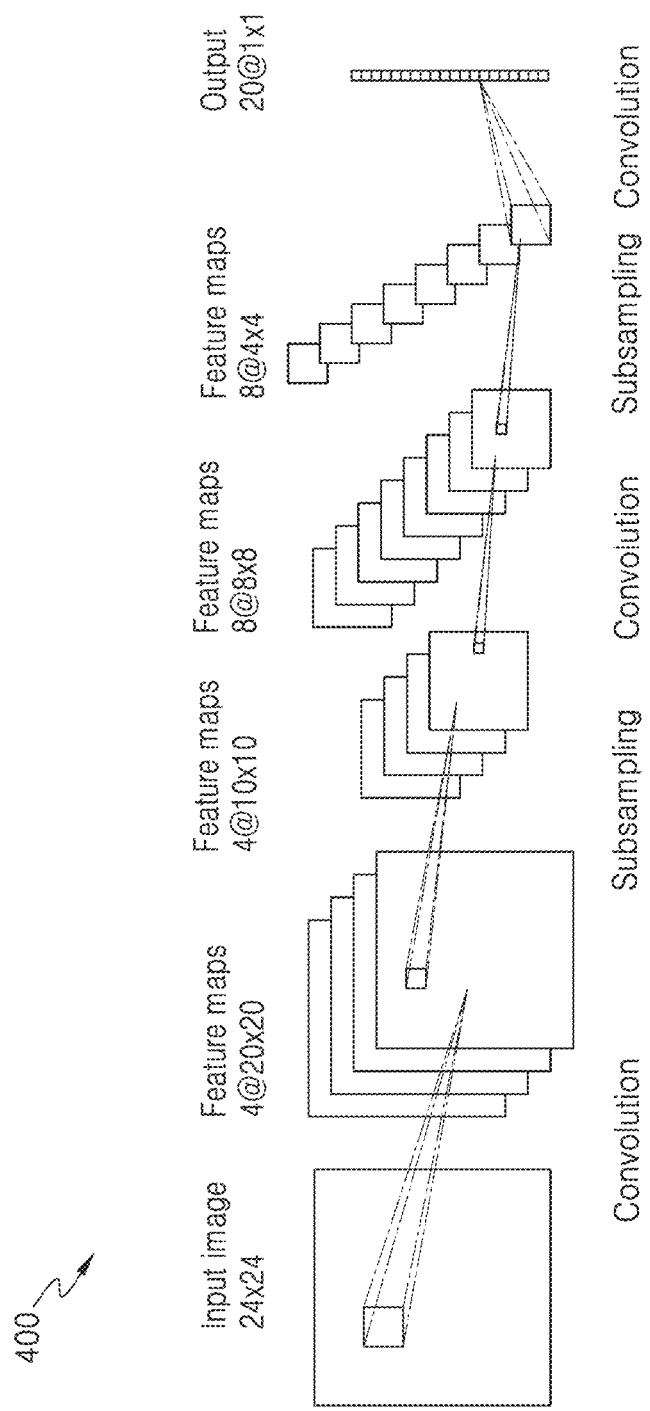
FIG. 4 is a view for describing an example of an architecture of a neural network in accordance with some example embodiments.

FIG. 4 is a view for describing an example of an architecture of a neural network in accordance with some example embodiments.

Referring to FIG. 4, some example embodiments may include a neural network 400 organized as an architecture of a deep neural network (DNN) or an n-layer neural network. For example, a DNN or an n-layer neural network may correspond to a convolutional neural network (CNN), a recurrent neural network (RNN), a deep belief network, a restricted Boltzmann machine, and the like. For example, the neural network 400 may be implemented with, but is not limited to, a CNN. Although a partial convolutional layer in a CNN as an example of the neural network 400 is illustrated in FIG. 4, a CNN in some example embodiments may also include a pooling layer, a fully connected layer, and so forth in addition to the illustrated convolutional layer.

In some example embodiments, a neural network 400 may be implemented as an architecture having a plurality of layers, such as an input image, feature maps, and an output. For example, in a neural network 400, an input image may be convolved with a filter called a kernel, such that the feature maps are output as a result of the convolutional operation. Output feature maps as input feature maps may be convolved with the kernel, wherein new feature maps are output as a result of the convolutional operation. As a result of repetition of convolution, a recognition result based on features of the input image through the neural network 400 may be output finally in accordance with some example embodiments In some example embodiments, an image of size 24×24 pixels may be input to the neural network 400 of FIG. 4, and/or an input image may be output as 4-channel feature maps having a size of 20×20 pixels through the convolutional operation with the kernel. Thereafter, the 20×20 feature maps may be reduced in size through repetition of convolution with the kernel, such that features having a size of 1×1 pixel may be output. In some example embodiments, the neural network 400 may be configured to filter and/or output robust features that are capable of representing an entire image from the input image, for example, by repeatedly performing convolution and sub-sampling (or pulling) in several layers and/or deriving a recognition result of the input image through output final features.

Figure 5:
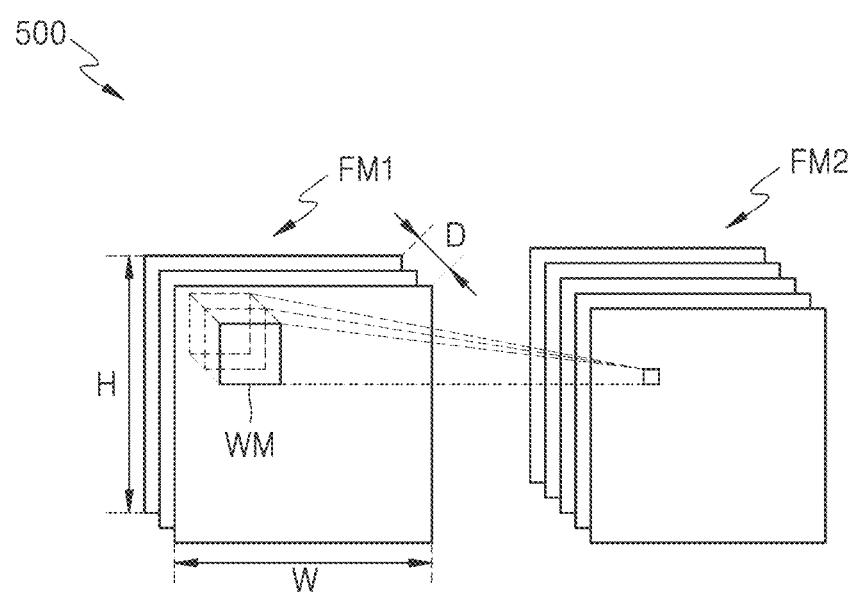
FIG. 5 is a view for describing a relationship between an input feature map and an output feature map in a neural network in accordance with some example embodiments.

FIG. 5 is a view for describing a relationship between an input feature map and an output feature map in a neural network in accordance with some example embodiments.

Referring to FIG. 5, in a layer 500 of a neural network, a first feature map FM1 may correspond to an input feature map and a second feature map FM2 may refer to an output feature map. As used herein, the term "feature map" may refer to a data set in which various features of input data are expressed. For example, the first feature map FM1 and the second feature map FM2 may have activations of a two-dimensional (2D) matrix or activations of a 3D matrix, and a pixel value may be defined in each activation. The first feature map FM1 and the second feature map FM2 may have a width W (also called a column), a height H (also called a row), and a depth D, which may correspond to a number of channels.

In some example embodiments, convolution may be performed based on to the first feature map FM1 and a kernel WM, and the second feature map FM2 may be generated. The kernel WM is a weight defined for each activation and is convolved with the first feature map FM1, such that features of the first feature map FM1 may be filtered. As the first feature map FM1 is shifted in a sliding window manner, the kernel WM may be convolved with windows (also called tiles) of the first feature map FM1. During each shift, each weight included in the kernel WM may be multiplied by and added to each of pixel values of overlapping windows in the first feature map FM1. As the first feature map FM1 and the kernel WM are convolved, one channel of the second feature map FM2 may be generated.

Some example embodiments may include one kernel WM, such as illustrated in FIG. 5. In some example embodiments, each of a plurality of kernels may be convolved with the first feature map FM1, such that the second feature map FM2 of a plurality of channels may be generated.

In some example embodiments, a second feature map FM2 may correspond to an input feature map of a next layer. For example, a second feature map FM2 may be an input feature map of a pulling (or sub-sampling) layer.

A schematic architecture of the neural network 400 is illustrated in FIGS. 4 and 5 that may be in accordance with some example embodiments. However, in some example embodiments, a neural network 400 may be implemented by more or fewer layers, feature maps, kernels, and so forth. In some example embodiments, sizes of such aspects of neural networks 400 may be changed variously, unlike illustrated in FIGS. 4 and 5, as would be understood by those of ordinary skill in the art.

Figure 6:
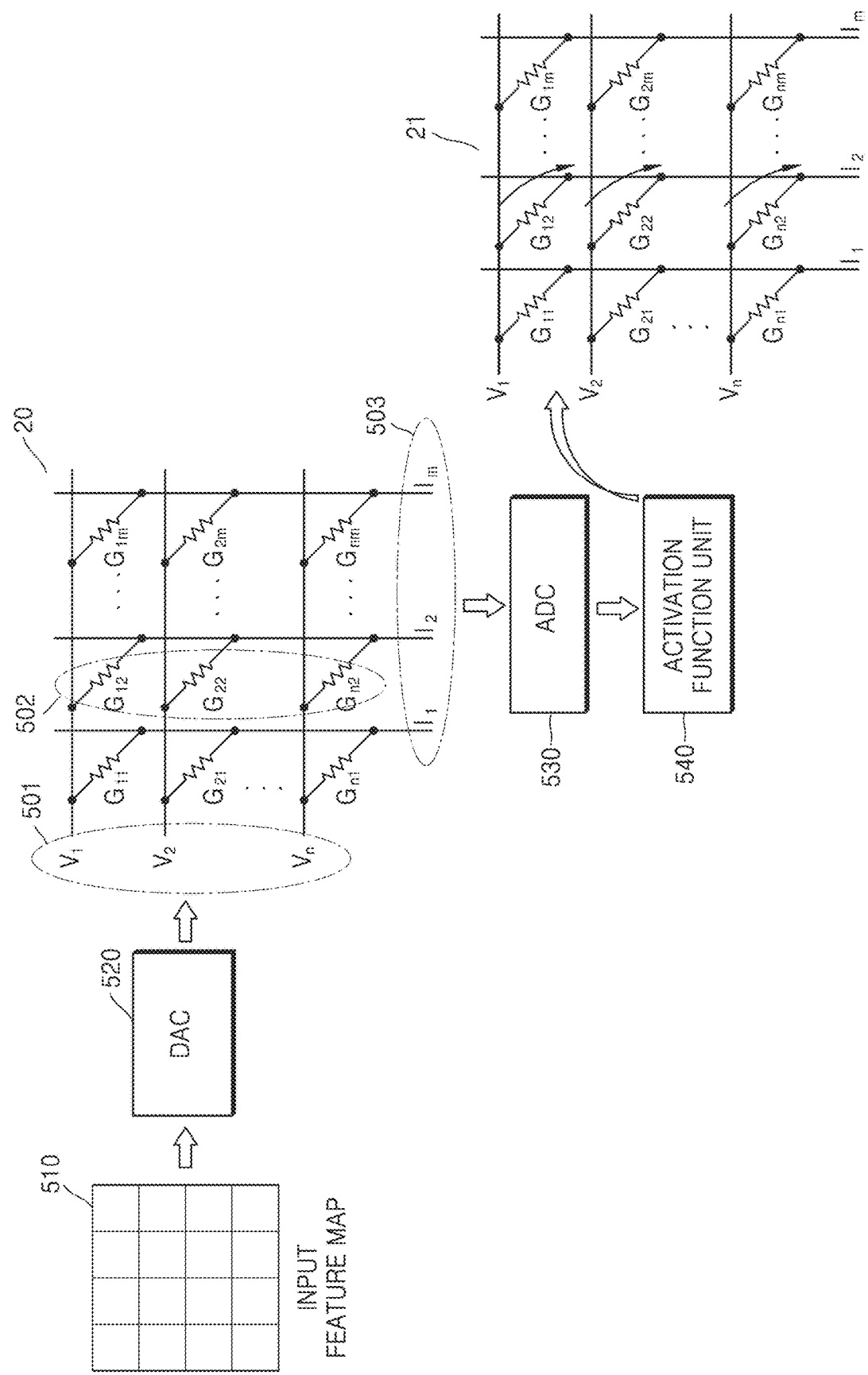
FIG. 6 is a view for describing an example in which a convolutional operation is performed by a neuromorphic apparatus in accordance with some example embodiments.

FIG. 6 is a view for describing an example in which a convolutional operation is performed by a neuromorphic apparatus in accordance with some example embodiments.

In FIG. 6, the neuromorphic apparatus 1100 may receive pixel data of an input feature map 510. For example, the core 20 of the neuromorphic apparatus 1100 may be implemented with a resistive crossbar memory array (RCA).

In some example embodiments, a core 20 may be organized as an N×M matrix (N and M are arbitrary natural numbers), where a number of pieces of pixel data (i.e., input activations) of the input feature map 510 may be fewer than or equal to a number of columns M of the core 20. For example, pixel data of the input feature map 510 may be a parameter in a floating-point format or a fixed-point format. In some example embodiments, a number of pieces of pixel data of the input feature map 510 may be greater than a number of columns M of the core 20, such as will be described with reference to FIGS. 7 and 8.

In some example embodiments, a neuromorphic apparatus 1100 may be configured to receive pixel data in a digital signal format and/or may be configured to convert the received pixel data into voltage, for example, in an analog signal format by using a digital-to-analog converter (DAC) 520. For example, the pixel data of the input feature map 510 may have various bit resolution values such as 1-bit, 4-bit, 8-bit resolutions, etc. In an example embodiment, a neuromorphic apparatus 1100 may be configured to convert the pixel data into voltages by using the DAC 520 and/or to receive voltages 501 as input activations of the core 20.

In some example embodiments, trained kernel values may be stored in the core 20, for example, in a memory cell of the core 20, such as a set of conductances 502. In some example embodiments, a neuromorphic apparatus 1100 may be configured to calculate an output value by performing vector multiplication based on voltages 501 and/or conductances 502, and/or to output an output value as a current 503. In some example embodiments, a neuromorphic apparatus 1100 may output the same result as a result of convolution between an input feature map and a kernel by using the core 20.

In some example embodiments, current 503 that is output from the core 20 may be used as an analog signal, for example, by a neuromorphic apparatus 1100 that is configured to apply an analog-to-digital converter (ADC) 530 to the current 503 to generate input data of another core. In some example embodiments, a neuromorphic apparatus 1100 may be configured to convert current 503, which is an analog signal, into a digital signal by using an ADC 530. For example, an neuromorphic apparatus 1100 may be configured to convert the current 503 into a digital signal by using the ADC 530 to have the same bit resolution as that of pixel data of the input feature map 510. In the case that the pixel data of the input feature map 510 has a 1-bit resolution, the neuromorphic apparatus 1100 may convert the current 503 into a digital signal of a 1-bit resolution by using the ADC 530.

The neuromorphic apparatus 1100 may apply an activation function to a digital signal converted by the ADC 530, by using an activation function unit 540. For example, the activation function may include, but is not limited to, a Sigmoid function, a Tanh function, and a rectified linear unit (ReLU) function.

The digital signal to which the activation function is applied may be used as an input activation of another core 21. In the case that the digital signal to which the activation function is applied is used as an input activation of the other core 21, the above-described process may be applied to the other core 21.

In some example embodiments, in the case that the number of pieces of pixel data of the input feature map 510 is greater than the number of columns M of the core 20, all pixel data of the input feature map 510 may not be processed at a time by the single core 20. Thus, the processing circuitry 1110 may be configured to divide the neural network into a plurality of sub-networks. In other words, the processing circuitry 1110 may be configured to divide the input feature map 510 of the neural network into a plurality of sub-feature maps.

Hereinbelow, a description will be made of an example embodiment where the processing circuitry 1110 divides a neural network into a plurality of sub-networks.

Figure 7:
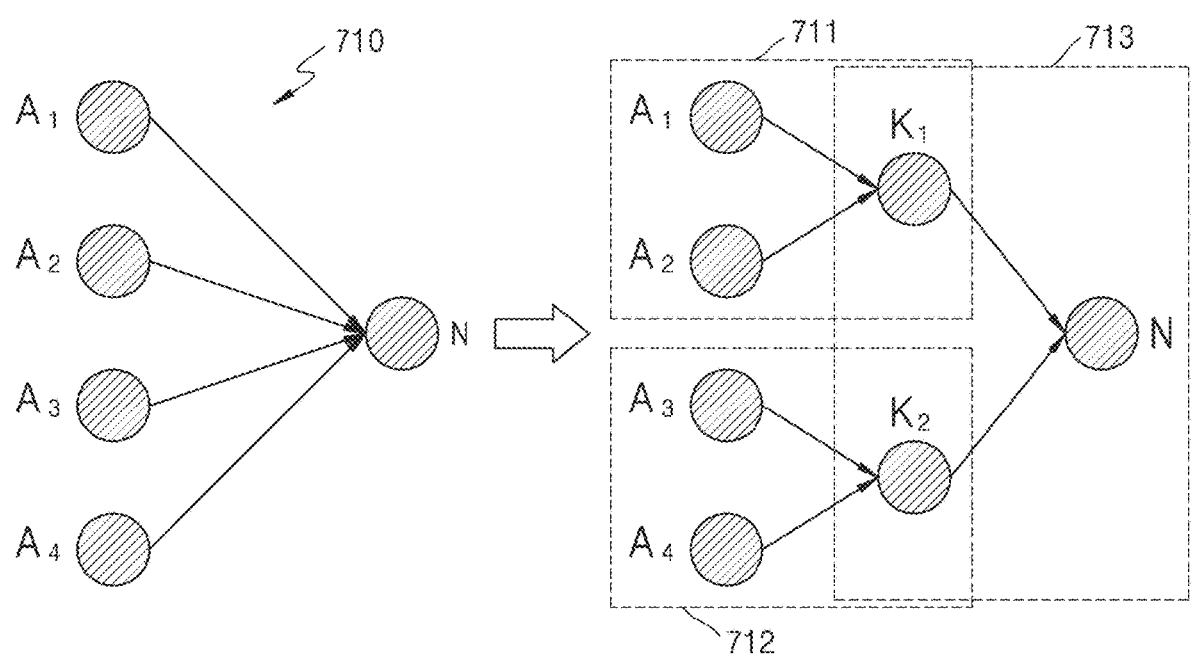
FIG. 7 is a view for describing an example of dividing a neural network in accordance with some example embodiments.

FIG. 7 is a view for describing an example embodiment in which processing circuitry 1110 is configured to divide a neural network in accordance with some example embodiments.

In FIG. 7, the neural network 710 includes four input activations $A_1$, $A_2$, $A_3$, and $A_4$ and one output activation N, where the core 20 of the neuromorphic apparatus 1100 includes two columns (i.e., two axon circuits 210 of the core 20). In this example, the core 20 includes two columns and four input activations $A_1$, $A_2$, $A_3$, and $A_4$ of the neural network 710 are provided, the core 20 may not be able to receive all of the input activations $A_1$, $A_2$, $A_3$, and $A_4$ of the neural network 710 at a time. Instead, the processing circuitry 1110 may be configured to divide the neural network 710 into first through third sub-networks 711, 712, and 713. That is, the processing circuitry 1110 may be configured to divide the neural network 710 such that the number of columns of the core 20 equals the number of input activations of at least one of the sub-networks 711, 712, and 713 of the plurality of sub-networks.

In some example embodiments including FIG. 7, processing circuitry 1110 may be configured to divide the neural network 710 in a manner that includes one or more intermediate activations $K_1$ and $K_2$. For example, the processing circuitry 1110 may be configured to divide the four input activations $A_1$, $A_2$, $A_3$, and $A_4$ into groups, each including two input activations, and to generate the intermediate activations $K_1$ and $K_2$ for the respective groups. For example, in FIG. 7, the neural network 710 is divided into the first sub-network 711 including the input activations $A_1$ and $A_2$ and the output activation $K_1$, the second sub-network 712 including the input activations $A_3$ and $A_4$ and the output activation $K_2$, and the third sub-network 713 including the input activations $K_1$ and $K_2$ and the output activation N. In FIG. 7, the first through third sub-networks 711, 712, and 713 each include two input activations, which equal the number of columns of the core 20, such that an operation of the single sub-network may be performed at a time by the core 20.

In some example embodiments, processing circuitry 1110 may be configured to train the sub-networks by using the initialized hyper-parameter. For example, the processing circuitry 1110 may be configured to train the sub-networks by using a general machine learning scheme. A variety of machine learning techniques may be utilized in the training of the sub-networks.

Figure 8:
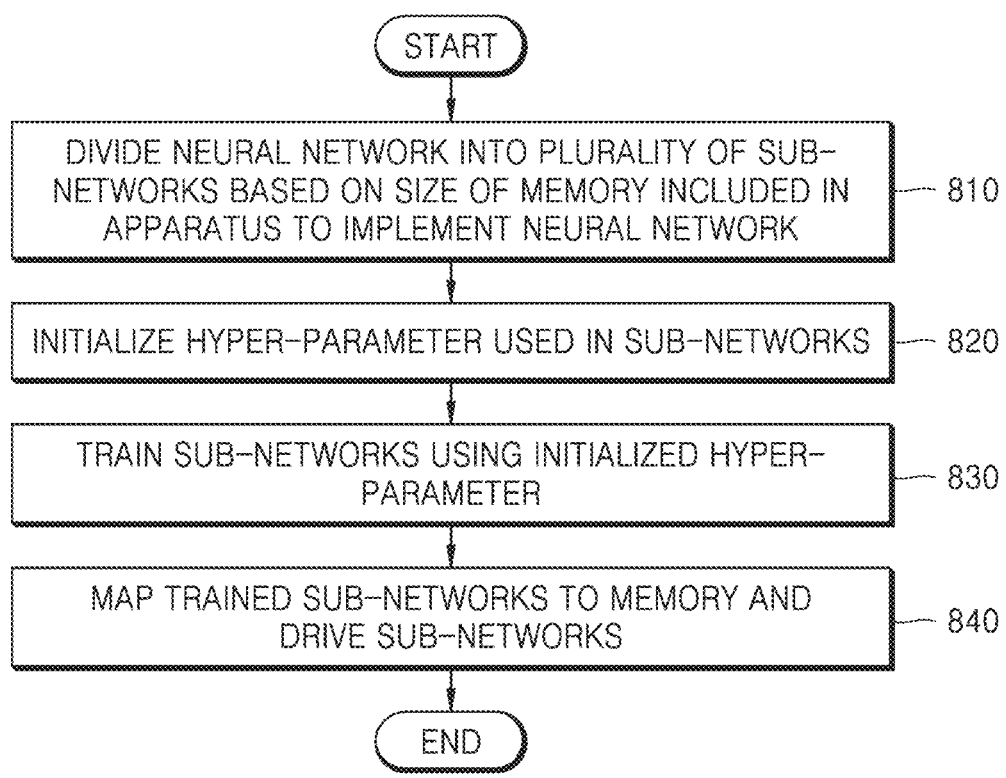
FIG. 8 is a flowchart illustrating another example in which a neuromorphic apparatus implements a neural network in accordance with some example embodiments.

FIG. 8 is a flowchart illustrating another example in which a neuromorphic apparatus implements a neural network in accordance with some example embodiments.

Operations 810 through 830 of FIG. 8 may respectively correspond to operations 310 through 330 of FIG. 3. Thus, a detailed description of operations 810 through 830 will not be provided.

In operation 840, the processing circuitry 1110 may map the trained sub-networks to the memory.

As described with reference to FIGS. 3 through 7, processing circuitry 1110 may be configured to divide a neural network into the plurality of sub-networks and/or to initialize the hyper-parameter used in the sub-network. The processing circuitry 1110 may be further configured to train the sub-networks by using the initialized hyper-parameter. Thereafter, the processing circuitry 1110 may be configured to map each of the trained sub-networks to each of the cores of a memory included in the neuromorphic apparatus 1100. For example, a final output activation output by an operation of the cores may be the same as a final output activation of the neural network.

Hereinafter, a description will be made with reference to FIGS. 9 and 10 of an example in which the processing circuitry 1110 maps a sub-network to a core and merges output activations of respective cores.

Figure 9:
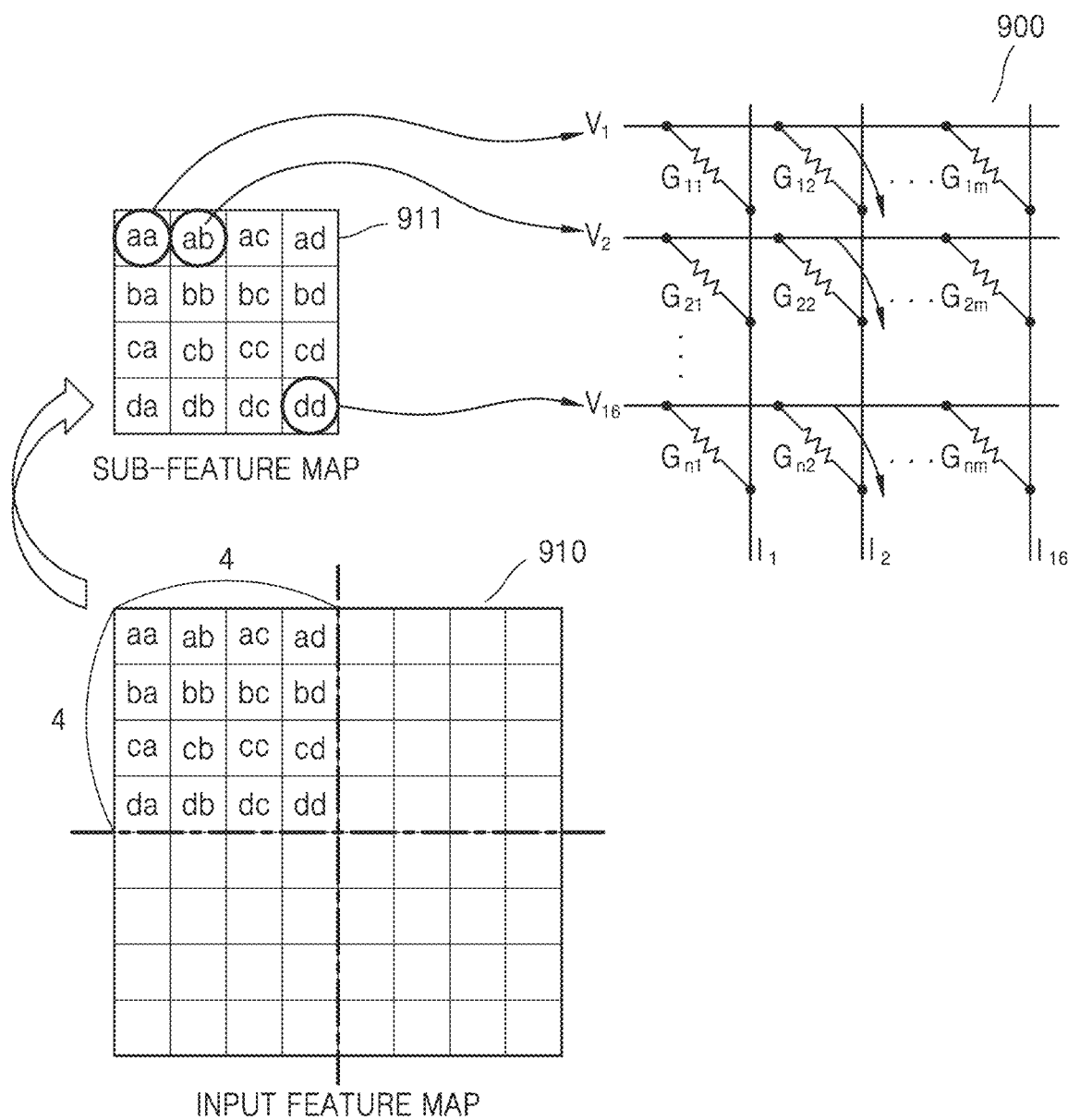
FIG. 9 is a view for describing an example in which processing circuitry is configured to map a sub-feature map corresponding to a sub-network to a core in accordance with some example embodiments.

FIG. 9 is a view for describing an example embodiment in which processing circuitry maps a sub-feature map corresponding to a sub-network to a core in accordance with some example embodiments.

For convenience, it is assumed that a size of an input feature map 910 is 8×8 and a size of a core 900 is 16×16 in FIG. 9. That is, the number of pieces of pixel data of the input feature map 910 is assumed to be 64 (=8×8).

In some example embodiments, an input feature map 910 may have various sizes, and/or a core 900 may have a restricted size. Thus, a number of pieces of pixel data of the input feature map 910 (that is, the number of input activations of the neural network) may be greater than a number of axon circuits included in the core 900. For example, a number of pieces of pixel data of the input feature map 910 of FIG. 9 is 64, and thus may be greater than a number of axon circuits of the core 900, 16. Similarly, in some example embodiments, a number of pieces of pixel data of the input feature map 910 may be greater than a number of axon circuits of the core 900 (that is, the number of columns M), the processing circuitry 1110 may be configured to divide the input feature map 910 into sub-feature maps. In other words, processing circuitry 1110 may be configured to divide the neural network into a plurality of sub-networks. For example, the processing circuitry 1110 may be configured to divide the input feature map 910 into sub-feature maps based on the size of the core 900.

In some example embodiments, based on a size of an input feature map 910 and/or a size of the core 900, processing circuitry 1110 may be configured to divide the input feature map 910 into four sub-feature maps, such that the number of pieces of pixel data of each sub-feature map is 16.

In some example embodiments, processing circuitry 1110 may be configured to map each sub-feature map to a separate core. For example, the processing circuitry 1110 may be configured to input 'aa' of a sub-feature map 911 as $V_1$ to a first axon circuit of the core 900, 'ab' of the sub-feature map 911 as $V_2$ to a second axon circuit of the core 900, and/or 'dd' of the sub-feature map 911 as $V_{16}$ to a sixteenth axon circuit of the core 900.

In some example embodiments, such as described above with reference to FIG. 6, pixel data of the sub-feature map 911 may be a digital signal (e.g., 1 bit, 4 bits, etc.), and/or a neuromorphic apparatus 1100 may convert pixel data into an analog signal using a DAC and input a converted value (e.g., a voltage value) to an axon circuit of the core 900.

Figure 10:
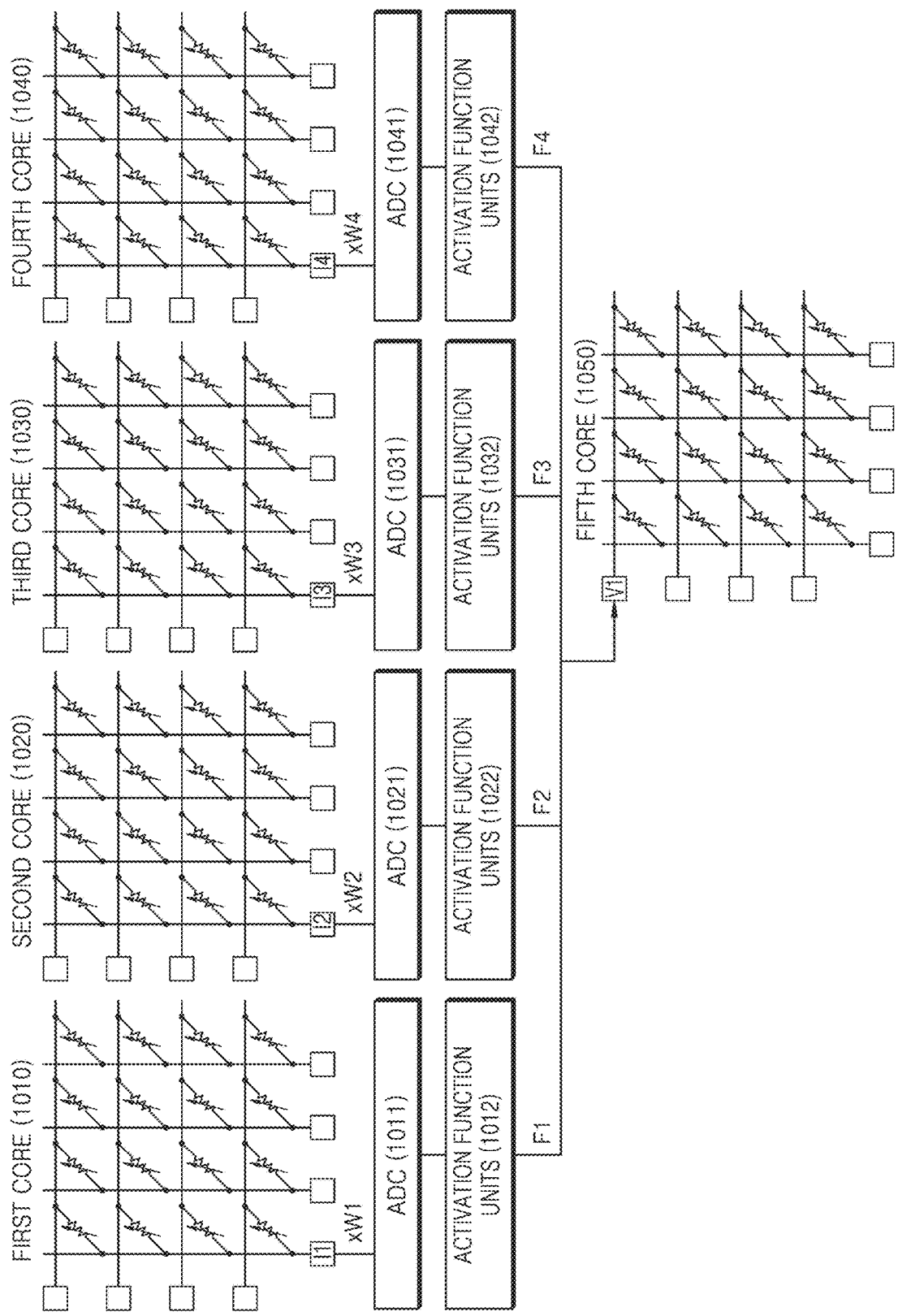
FIG. 10 is a view for describing an example in which processing circuitry is configured to merge output values calculated by a plurality of cores.

FIG. 10 is a view for describing an example in which processing circuitry is configured to merge output values calculated by a plurality of cores in accordance with some example embodiments. In FIG. 10, each of first through fifth cores 1010 through 1050 has a size of 4×4, and an input feature map having a size of 4×4 is divided into four sub-feature maps.

In FIG. 10, pixel data 'aa', 'ab', 'ba', and 'bb' of the first sub-feature map may be input to axon circuits of the first core 1010. For example, the neuromorphic apparatus 1100 may be configured to convert the pixel data 'aa', 'ab', 'ba', and 'bb' in the digital signal format into a voltage in the analog signal format by using a DAC (not shown), and/or to input the voltage to the axon circuits of the first core 1010. Likewise, the neuromorphic apparatus 1100 may be configured to convert pixel data of each of second through fourth sub-feature maps into an analog signal and/or to input axon circuits of the second through fourth cores 1020 through 1040.

In some example embodiments, such as described above with reference to FIG. 2, initialized kernel values may be stored as conductance values in a memory cell of the first through fifth cores 1010 through 1050.

In some example embodiments, a neuromorphic apparatus 1100 may be configured to perform vector-multiplication based on a conductance value stored in the memory cell of the first through fourth cores 1010 through 1040 and/or an input voltage value. As a result of vector-multiplication, the neuromorphic apparatus 1100 may calculate output values of the first through fourth cores 1010 through 1040. In some example embodiments, the neuromorphic apparatus 1100 may be configured to receive, from each of the first through fourth cores 1010 through 1040, pixel data of the first fourth sub-feature maps as an input, to merge outputs of the first through fourth cores 1010 through 1040, and/or to transmit the merged outputs as an input of the fifth core 1050.

In some example embodiments, a neuromorphic apparatus 1100 may be configured to convert an output of each of the first through fourth cores 1010 through 1040 into a digital signal by using one or more of ADCs 1011, 1021, 1031, and 1041. The neuromorphic apparatus 1100 may be configured to apply an activation function to a digital signal by using activation function units 1012, 1022, 1032, and 1042. The neuromorphic apparatus 1100 may be configured to merge results to which the activation function is applied and/or to transmit a result of merging as the input of the fifth core 1050.

In some example embodiments, a neuromorphic apparatus 1100 may be configured to merge outputs of column lines having identical orders in respective cores among outputs passing through the first through fourth cores 1010 through 1040, the ADCs 1011 through 1041, and/or the activation function units 1012 through 1042. For example, the neuromorphic apparatus 1100 may be configured to merge a first output F1 resulting from an output I1 of the first core 1010, which passes through the ADC 1011 and the activation function unit 1012, a second output F2 resulting from an output I2 of the second core 1020, which passes through the ADC 1021 and the activation function unit 1022, a third output F3 resulting from an output I3 of the third core 1030, which passes through the ADC 1031 and the activation function unit 1032, and/or a fourth output F4 resulting from an output I4 of the fourth core 1040, which passes through the ADC 1041 and the activation function unit 1042. For example, the neuromorphic apparatus 1100 may merge the first through fourth outputs F1, F2, F3, and F4 and input a result of merging as V1 to the axon circuit of the fifth core 1050.

In some example embodiments, a neuromorphic apparatus 1100 may be configured to merge the outputs I1 through I4 calculated from the first through fourth cores 1010 through 1040 after multiplying weights W1 through W4 to the outputs I1 through I4, respectively.

In some example embodiments, the weights W1 through W4 may be different from kernel and/or may be determined by training in the neural network. For example, the weights W1 through W4 may be, but are not limited to, 1.

Likewise, in some example embodiments, a neuromorphic apparatus 1100 may be configured to merge outputs calculated from the other neuron circuits of the first through fourth cores 1010 through 1040 and then input the merged output to the other axon circuits of the fifth core 1050.

FIG. 11 is a structural diagram illustrating an example of a neuromorphic apparatus and a memory connected thereto in accordance with some example embodiments.

Referring to FIG. 11, the neuromorphic apparatus 1100 may include processing circuitry 1110 and/or the memory 1120. The neuromorphic apparatus 1100 illustrated in FIG. 11 includes elements that may be associated with some example embodiments. Thus, it would be understood by those of ordinary skill in the art that some example embodiments may include elements other than the elements illustrated in FIG. 11 in a neuromorphic apparatus 1100.

In some example embodiments, the neuromorphic apparatus 1100 may be mounted on a digital system requiring driving of a low-power neural network, such as a smartphone, a drone, a tablet device, an augmented reality (AR) device, an Internet of Things (IoT) device, an autonomous vehicle, robotics, medical equipment, and so forth. Other example embodiments may not be mounted to a digital system.

In some example embodiments, the neuromorphic apparatus 1100 may include at least one memory 1120 that may include a plurality of cores. The core may include a plurality of presynaptic neurons, a plurality of postsynaptic neurons, and a synapse, i.e., a memory cell providing connections between the plurality of presynaptic neurons and the plurality of postsynaptic neurons. For example, a core may be implemented with an RCA.

Some example embodiments may include memory 1130 that is on-chip, off-chip, or a combination thereof. Some example embodiments may include memory 1130 that is internal to a neuromorphic apparatus 1100, external to a neuromorphic apparatus 110, or a combination thereof. Some example embodiments may include a memory 1130, which may be hardware configured to store various data processed in the neuromorphic apparatus 1100, and/or may be configured to store data processed and/or to be processed by the neuromorphic apparatus 1100. In some example embodiments, memory 1130 may be configured to store applications, drivers, etc., to be driven by the neuromorphic apparatus 1100. In some example embodiments, the memory 1130 may be include random access memory (RAM) such as dynamic random-access memory (DRAM), static random-access memory (SRAM), etc., read-only memory (ROM), electrically erasable programmable read-only memory (EEPROM), compact disk (CD)-ROM, Blu-ray or other optical disk storages, hard disk drive (HDD), solid state drive (SSD), or flash memory.

In some example embodiments, processing circuitry 1110 may be configured to control functions for driving the neuromorphic apparatus 1100. For example, the processing circuitry 1110 may be configured to control the neuromorphic apparatus 1100 by executing programs stored in the memory 1120 of the neuromorphic apparatus 1100. In some example embodiments, the processing circuitry may include hardware such as logic circuits; a hardware/software combination, such as a processor executing software; or a combination thereof. For example, a processor may include, but is not limited to, a central processing unit (CPU), a graphics processing unit (GPU), an application processor (AP) included in the neuromorphic apparatus 1100, an arithmetic logic unit (ALU), a digital signal processor, a microcomputer, a field programmable gate array (FPGA), a System-on-Chip (SoC), a programmable logic unit, a microprocessor, application-specific integrated circuit (ASIC), or the like. In some example embodiments, the processing circuitry 1110 may be configured to read/write various data from/in the memory 1130 and/or execute the neuromorphic apparatus 1100 by using the read/written data.

In some example embodiments, the processing circuitry 1110 may be configured to divide the neural network into the plurality of sub-networks based on the size of the core of the memory 1120. For example, the processing circuitry 1110 may be configured to initialize a hyper-parameter used in the sub-networks. The processing circuitry 1110 may then be configured to train the sub-networks by using the initialized hyper-parameter. The processing circuitry 1110 may be configured to map the trained sub-networks to the on-chip memory 1120 and drive the same.

As stated above, in some example embodiments, a number of input activations of the neural network may be greater than a number of axon circuits of the core, and a neuromorphic apparatus 1100 may be configured to divide the neural network into sub-networks and map each of the divided sub-networks to a separate core. That is, in some example embodiments, the neuromorphic apparatus 1100 may be configured to reduce consumption of power needed for an operation while preserving an operation capability of the neural network, by dividing the neural network for processing.

Some example embodiments may include programs executable on computers or other devices such as a neuromorphic apparatus, and/or may be implemented on general-purpose digital computers operating the programs by using a computer-readable recording medium. In some example embodiments, a structure of data used in the above-described method may be recorded on a computer-readable recording medium using various means. The computer-readable recording medium may include storage medium such as a magnetic storage medium (e.g., ROM, RAM, a universal serial bus (USB), floppy disks, hard disks, etc.), an optical recording medium (e.g., compact disk (CD)-ROMs, digital versatile disks (DVDs), etc.), so forth.

It may be understood by those of ordinary skill in the art that the disclosure may be implemented in a modified form without departing from the essential characteristics of the disclosure. Therefore, example embodiments disclosed herein should be considered in a descriptive sense only and not for purposes of limitation, and the scope of the disclo-

What is claimed is:

1. A method of implementing a neural network in a neuromorphic apparatus having a memory and processing circuitry, the method comprising:
dividing, by the processing circuitry, the neural network into a plurality of sub-networks by,
determining a number of axon circuits included in a core of the memory,
determining a number of input activations to the neural network, and
dividing the neural network into the plurality of sub-networks based on the number of axon circuits and the number of input activations such that a number of the input activations associated with each of the sub-networks is equal to the number of axon circuits;
initializing, by the processing circuitry, a hyper-parameter used in the sub-networks; and
training, by the processing circuitry, the sub-networks by using the hyper-parameter.

2. The method of claim 1, wherein the initializing further comprises initializing, by the processing circuitry, the hyper-parameter with an initial value based on the number of axon circuits included in the core.

3. The method of claim 1, wherein the initializing further comprises initializing, by the processing circuitry, the hyper-parameter with a value selected from among values indicating a standard deviation of input activations of a sub-network of the neural network.

4. The method of claim 3, wherein the standard deviation is based on a number of the input activations of the sub-network with a number of sub-networks.

5. The method of claim 1, wherein the dividing further comprises:
arranging the plurality of sub-networks in stages such that each stage includes a number of the sub-networks arranged in parallel that together have a number of the input activations equal to a number of output activations of a prior stage.

6. The method of claim 5, further comprising:
mapping each of the plurality of sub-networks in a same stage to different ones of a plurality of cores.

7. The method of claim 1, further comprising:
mapping, by the processing circuitry, the sub-networks to the memory, and
driving the sub-networks by the processing circuitry.

8. The method of claim 1, wherein an element corresponding to a synapse in the core comprises a variable resistance element.

9. A non-transitory computer-readable recording medium having recorded thereon a program for executing the method of claim 1 on a computer.

10. An apparatus for implementing a neural network, the apparatus comprising:
a memory comprising a core; and
processing circuitry configured to drive the neural network by,
dividing the neural network into a plurality of sub-networks by,
determining a number of axon circuits included in the core of the memory,
determining a number of input activations to the neural network, and
dividing the neural network into the plurality of sub-networks based on the number of axon circuits and the number of input activations such that a number of the input activations associated with each of the sub-networks is equal to the number of axon circuits;
initializing a hyper-parameter used in the sub-networks; and
training the sub-networks by using the hyper-parameter.

11. The apparatus of claim 10, wherein the processing circuitry is further configured to initialize the hyper-parameter with an initial value selected based on the number of axon circuits included in the core.

12. The apparatus of claim 10, wherein the processing circuitry is further configured to initialize the hyper-parameter with a value selected from among values indicating a standard deviation.

13. The apparatus of claim 12, wherein the processing circuitry is further configured to initialize the hyper-parameter by calculating the standard deviation by merging a number of input activations of the sub-network with a number of sub-networks.

14. The apparatus of claim 10, wherein the processing circuitry is further configured to drive the neural network by generating at least one intermediate activation by dividing the neural network.

15. The apparatus of claim 10, wherein the processing circuitry is further configured to drive the neural network by mapping the sub-networks to the memory and drive the sub-networks.

16. The apparatus of claim 10, wherein an element corresponding to a synapse in the core comprises a variable resistance element.

17. The apparatus of claim 10, wherein the processing circuitry is further configured to divide the neural network into the plurality of sub-networks by,
arranging the plurality of sub-networks in stages such that each stage includes a number of the sub-networks arranged in parallel that together have a number of the input activations equal to a number of output activations of a prior stage.

18. The apparatus of claim 17, wherein the processing circuitry is further configured to map each of the plurality of sub-networks in a same stage to different ones of a plurality of cores.

* * * * *